(12) United States Patent
Starita

(10) Patent No.: US 6,652,258 B1
(45) Date of Patent: Nov. 25, 2003

(54) MOLD BLOCK FOR THERMOFORMING LARGE DIAMETER CORRUGATED PLASTIC PIPE

(76) Inventor: Joseph M. Starita, 1180 W. 5th St., Marysville, OH (US) 43040

( * ) Notice: Subject to any disclaimer, the term of this patent is extended or adjusted under 35 U.S.C. 154(b) by 0 days.

(21) Appl. No.: 09/579,782

(22) Filed: May 26, 2000

(51) Int. Cl.$^7$ .............................................. B29C 47/90
(52) U.S. Cl. .................... 425/195; 425/233; 425/326.1; 425/336; 425/369; 425/384; 425/388; 425/396
(58) Field of Search ................................ 425/195, 233, 425/326.1, 336, 369, 384, 388, 396

(56) References Cited

U.S. PATENT DOCUMENTS 4,718,844 A * 1/1988 Dickhut et al. ............. 425/336
5,059,109 A * 10/1991 Dickhut et al. ............. 425/233

* cited by examiner

Primary Examiner—James P. Mackey
Assistant Examiner—Joseph Leyson
(74) Attorney, Agent, or Firm—Porter, Wright, Morris & Arthur LLP

(57) ABSTRACT

Mold blocks and methods for thermoforming corrugated plastic pipe that provide a uniform vacuum on the internal lateral surface and optimize forced convective cooling on exterior surface is disclosed. Mating mold blocks have an interior surface with transverse corrugations and an exterior lateral surface having transverse channels containing radial slots that intersect circular slits formed in the interior mold surface. The channels are fitted with a dual cover arrangement that serves to provide (1) a low-resistance vacuum path to the slits located on the interior surface and (2) a forced convective heat transfer path to cool the mold blocks. The cover arrangement is removable, providing a convenient means of inspecting, maintaining and modifying the mold blocks.

5 Claims, 12 Drawing Sheets

SECTION A-A

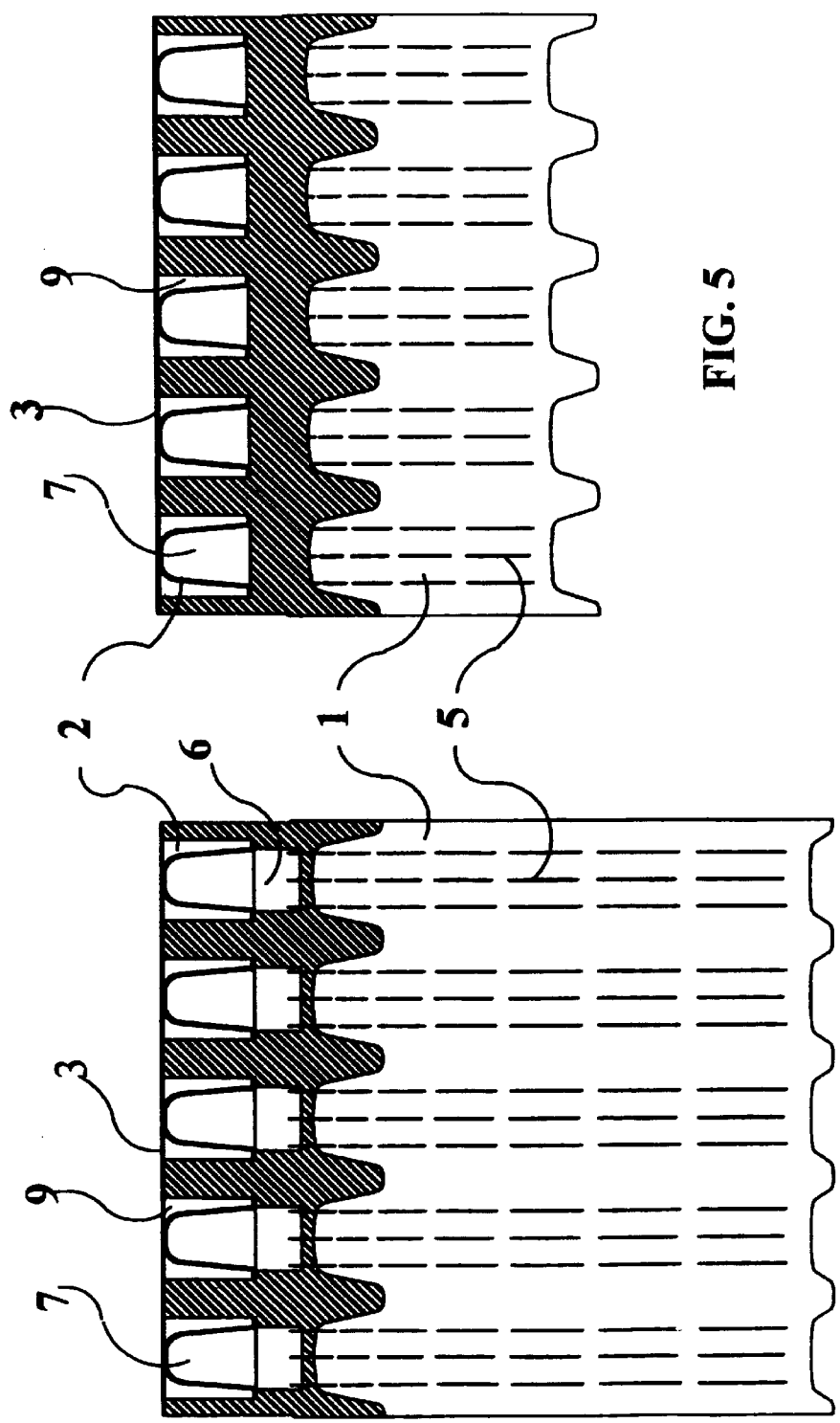

MOLD BLOCK FOR THERMOFORMING LARGE DIAMETER CORRUGATED PLASTIC PIPE

FIELD OF THE INVENTION

The invention relates to mold blocks, and more particularly to a mold block assembly and methods for forming plastic pipe having transverse profile features.

BACKGROUND OF THE INVENTION

Manufacturers of corrugated plastic pipe have successfully displaced concrete pipe and corrugated metal pipe in drainage applications. This success initially occurred with corrugated plastic pipe having diameters of less than 30 inches. Supplying a uniform vacuum along the interior lateral surface of the mold and efficiently cooling the molded pipe have been problematic with corrugated pipe having diameters of 30 through 72 inches. The pipe is typically fabricated by co-extruding an inner and outer tube of melted plastic. The inner tube is kept smooth by passing it over a cooling and sizing mandrel. Transverse corrugations are fabricated by thermoforming the continuously extruded outer tube of melted plastic. This thermoforming operation is accomplished by closing mating pairs of mold blocks around the tube of molten plastic, drawing the molten plastic tube into the desired corrugated shape by creating a negative pressure at the interior lateral surface of the mold block, and solidifying the formed molten plastic tube by cooling the plastic to a temperature below its softening point. During this process the mold blocks travel with the molten plastic tube.

Because the mating pairs of mold blocks must constantly repeat a cycle of closing around the extrusion die, traveling with the extruded molten plastic tube, opening and returning to the extrusion die head location, it is not practical to connect a series of hoses and/or tubing for vacuum porting or cooling fluids. As a result, the mold block typically is supplied negative pressure via a single sliding connection. The uniformity of negative pressure at the mold surface therefore depends on the length and size of the vacuum paths contained in the mold block itself. U.S. Pat. No. 5,059,109 to Heindrich Dickhut and John S. Berns and U.S. Pat. No. 5,002,478 to Manfred A. A. Lupke recognized this problem. Both attempted solutions whereby a single sliding vacuum connection per mold block is utilized. The single vacuum connection necessitates variations in the path length from the negative pressure source to locations on the interior lateral surface of the mold blocks. Stated in another way, there will be areas on the mold surface further from the vacuum source than others. As the size of the mold block approaches 60–72 inches in diameter, the distance between the mold surface and the vacuum source can vary as much as 90–115 inches. Newton's law of viscosity at a constant flow rate predicts a linear dependence of the pressure on the distance the air travels from the mold surface to the vacuum source. This dependence results in a reduction in negative pressure available at locations located far from the vacuum source. Lupke requires that the mold be constructed in segments having a width of one pitch of the corrugation. Such construction requires a great deal of costly precision machining and still does not allow sufficient vacuum porting.

The present invention contrasts with the prior art, which embodies the misconception that in order to minimize the change in pressure and resistance to flow through a pipe or closed channel, the area normal to the flow must be enlarged. The problem with this approach is that the resistance to flow along a path is not simply dependent on the area. Thus, in order to insure uniform vacuum pressure at the internal lateral surface of the mold, it is insufficient to merely determine the dimension of area normal to the flow.

The present invention offers a means of accurately providing a large and uniform vacuum at the mold surface by defining the shape and size of the channel. Dickhut et al. teach a channel with a depth less than its width. Although an intuitive approach assumes the pressure drop along a channel with a larger area is always smaller than that along a channel with a smaller area, this assumption is false. It is much more efficient for channel depth to be larger than channel width because the change in pressure varies with the $3^{rd}$ power of the channel depth and only linearly with the channel width. A narrower and deeper channel with the same area will be superior to a wider and more shallow channel for purposes of optimizing the force and uniformity of negative vacuum pressure at the mold surface. Similarly, a wider channel with smaller depth might have a larger area than one which presents much less resistance to flow. The present invention quantifies this phenomenon so as to eliminate design ambiguities and provides a criterion for optimizing the performance of the mold blocks.

A second problem that occurs with increased size of mold blocks is the reduction in cooling efficiency caused by the decrease in the ratio of the lateral surface area to the volume of the mold blocks. The exterior lateral area as compared to the volume of the mold block decreases rapidly as pipe diameter increases, as can be demonstrated by the parametric representation of a cylindrical tube:

Volume of a cylinder $V=\pi(D_o^2-D_i^2)L/4$

Area of the exterior lateral surface of a cylinder $A_o=\pi D_o L$

Ratio of the exterior lateral surface to the volume $A/V=4D_o/(D_o^2-D_i^2)$

Where:
$D_i$=inside diameter of a cylinder
$D_o$=outside diameter of a cylinder
L=length of the cylinder Thus, the heat transfer area available to be cooled compared to the volume conducting the heat away from the internal lateral mold surfaces decreases significantly as the diameter of the mold block increases. Lower cooling rates associated with molds for large diameter corrugated plastic pipe cause quality problems, which are compensated for by increasing the number of traveling mold blocks in contact with the forming pipe or by slowing the extrusion rate of molten plastic pipe. Both options have a significant cost impact on the manufacturer.

SUMMARY OF THE INVENTION

It is an object of this invention to provide uniform negative pressure at the interior lateral surface of mold blocks utilized to manufacture large diameter corrugated plastic pipe. This is accomplished by providing mating pairs of mold blocks with open transverse channels fabricated on an exterior lateral surface. The open transverse channels connect a vacuum source to a series of radial slots in the valley of the channel. The series of radial slots in turn intersects a series of thin slits located at the interior lateral surface of the mold block. Each intersection of a radial slot and thin slit forms an orifice having a length that is independent of the depth of the slit. Each slot is of approximately the same width in the preferred embodiment, which ensures that slit length is independent of slit depth.

Each open transverse channel is fitted with an inner air-tight cover forming an exterior manifold that provides a low-resistance path between the vacuum source and the series of radial slots connected to slits located at the interior mold surface. The external manifold must have a cross-sectional area sufficiently large to insure that the change in negative pressure between the vacuum source and the series of slots connected to the slits at the mold surface is very small compared to the change in negative pressure between the intersections of radial slots and thin slits and the interior lateral surface of the mold blocks.

It is a further object of the present invention to provide mold blocks capable of efficiently removing heat to solidify the molten plastic into a pipe with transverse corrugations in a timely fashion. This invention provides enhanced cooling by forced convection so that an outer cover forms a duct with the inner cover and the walls of the open transverse channel. This duct provides a means of directing a stream of turbulent cooling air along the interior walls of the external channel before it exits to the atmosphere. The combination of the radial surface area of the transverse channel and the flow rate of cooling air sufficiently remove in a timely fashion the heat conducted to the mold surface during the process of cooling the molten plastic pipe to its melting point and then crystallizing the plastic and finally cooling the crystallized plastic pipe to increase its stiffness.

This invention relates to the design and assembly of mold blocks and methods for forming large diameter plastic pipe with transverse corrugations and has the following benefits: (1) uniform vacuum porting at the internal lateral mold surface; (2) enhanced heat transfer characteristics; (3) removable covers for inspecting, maintaining and modifying the mold blocks; and (4) elimination of the high fabrication costs associated with cross drilling and with segmented mold blocks having internal channels.

The invention is described more fully in the following description of the preferred embodiment considered in view of the drawings in which:

BRIEF DESCRIPTION OF THE DRAWINGS

FIG. 4 is a radial sectional view of the mold block of FIG. 3A, taken at the intersection with the radial slots;

FIG. 5 is a radial sectional view of the mold block of FIG. 3A, taken at a point other than at intersection with the radial slots;

DETAILED DESCRIPTION OF THE INVENTION AND THE PREFERRED EMBODIMENT

Figure 1:
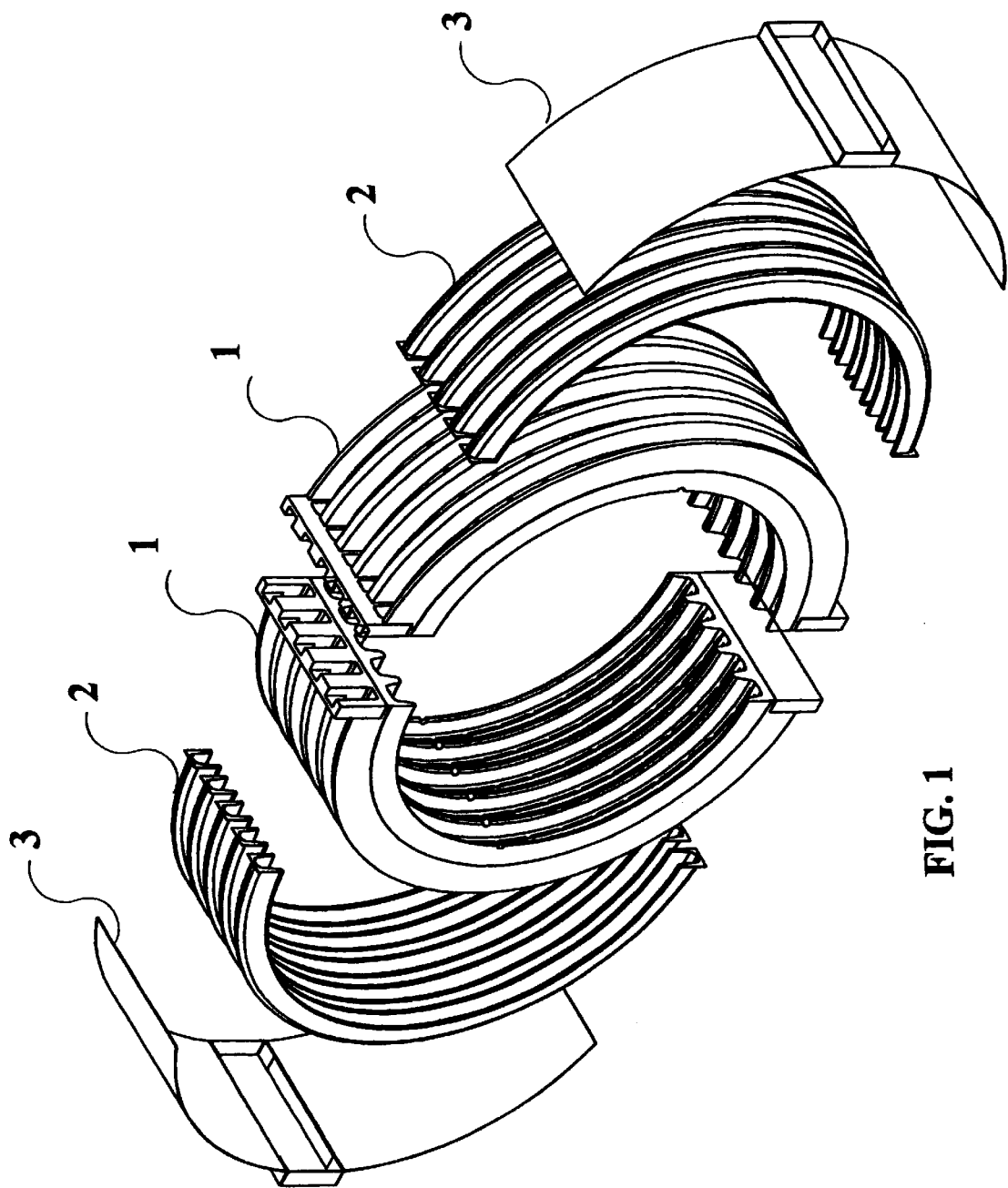
FIG. 1 is an exploded perspective view of a preferred embodiment of the mating pair of mold blocks described herein.
Figure 2:
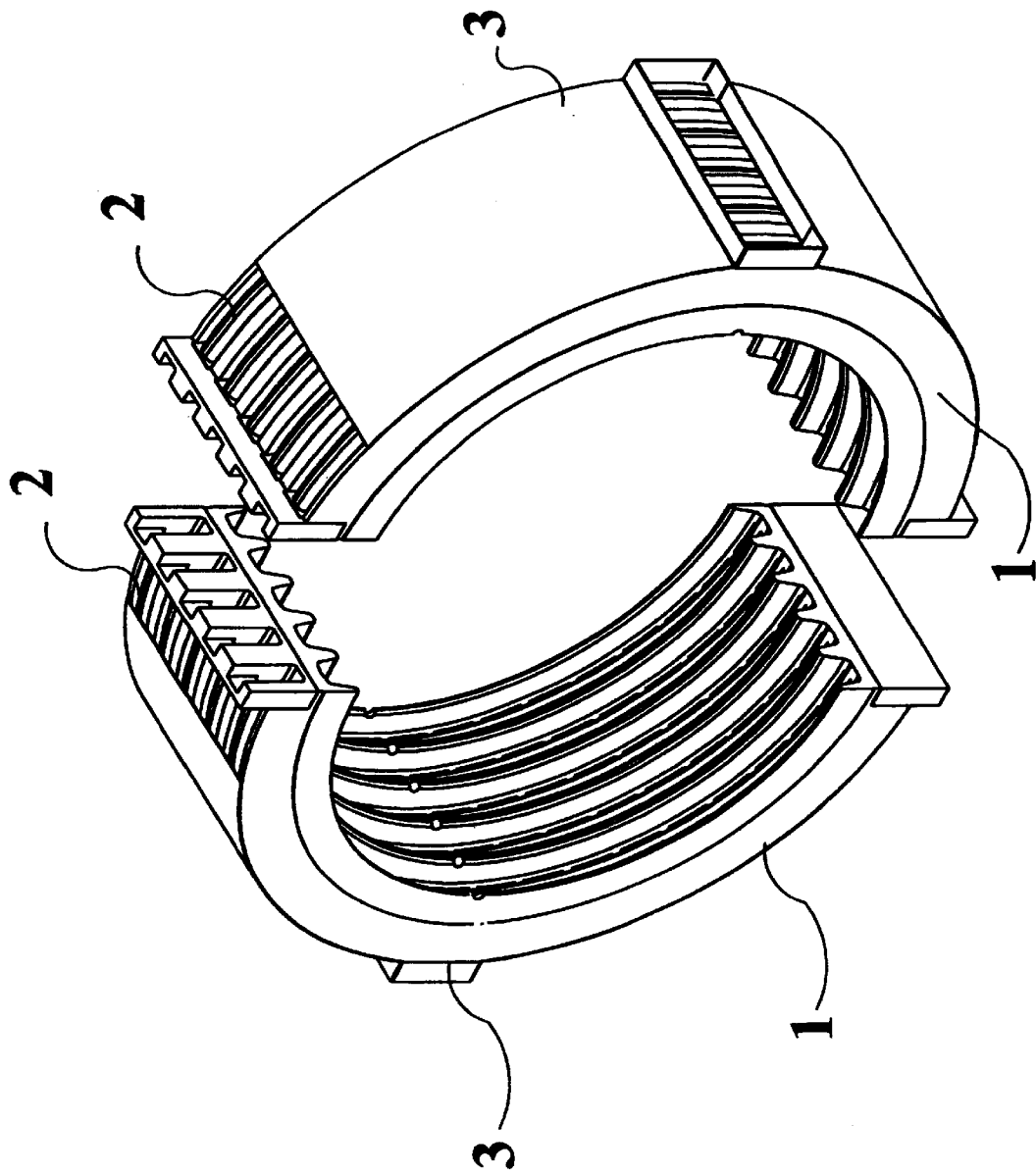
FIG. 2 is a perspective view of a mating pair of the mold block assembly of FIG. 1.
Figure 3A:
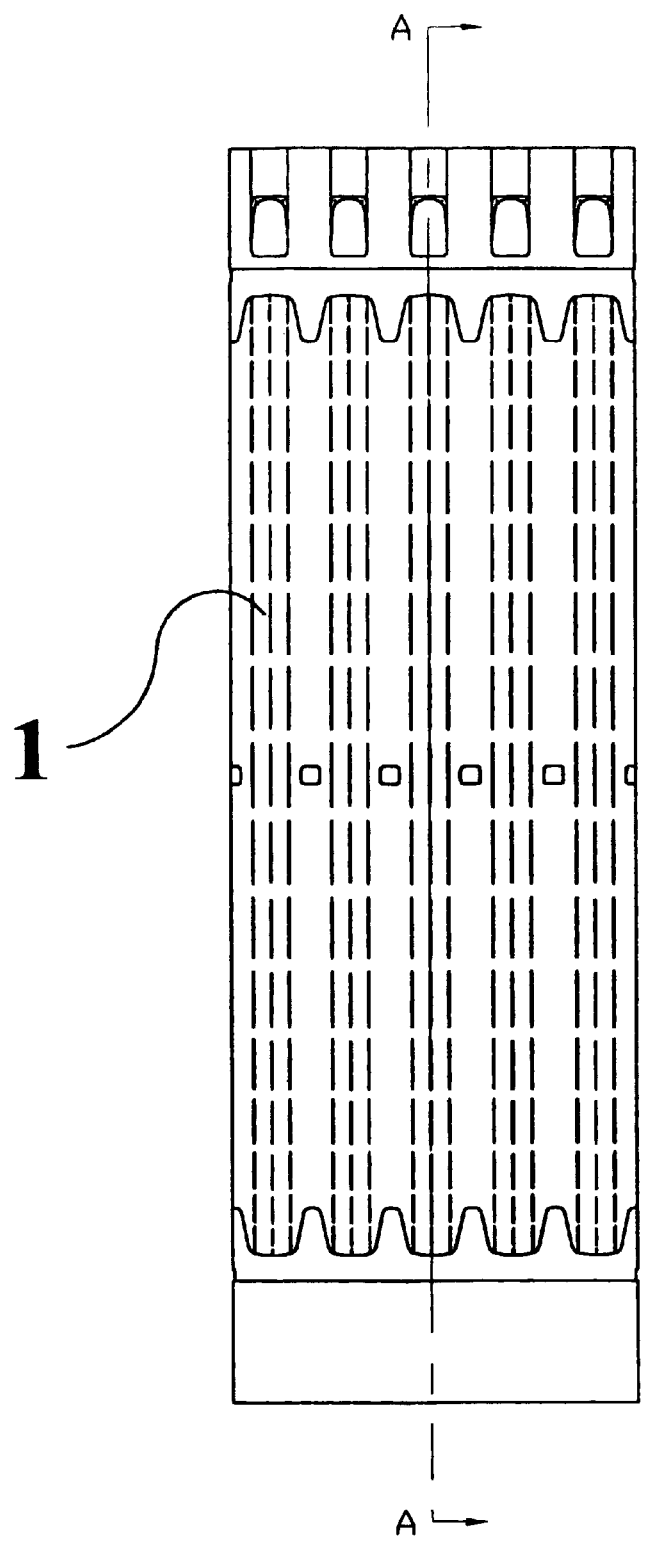
FIG. 3A is a front view of either of the mold blocks of FIG. 1.
Figure 3B:
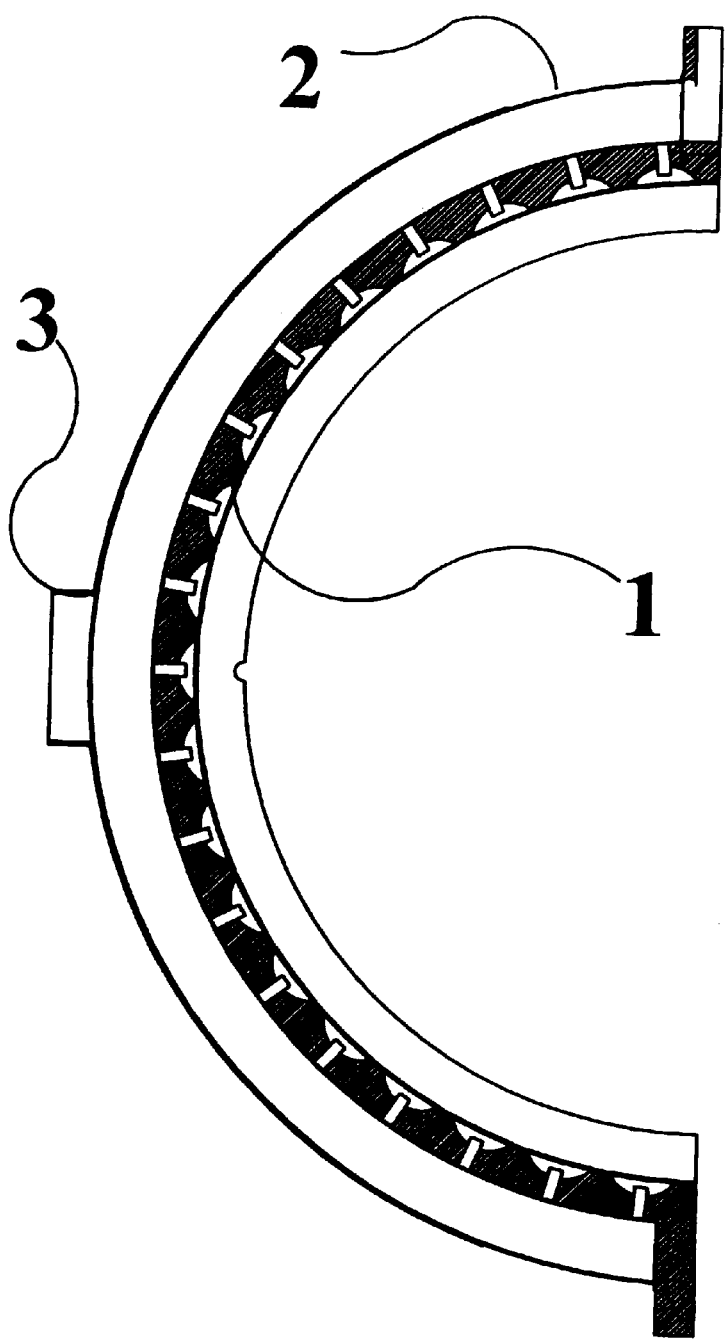
FIG. 3B is a sectional view taken along line →A—A← of FIG. 3A, particularly illustrating the upper portion of a mold block of the present assembly.
Figure 3C:
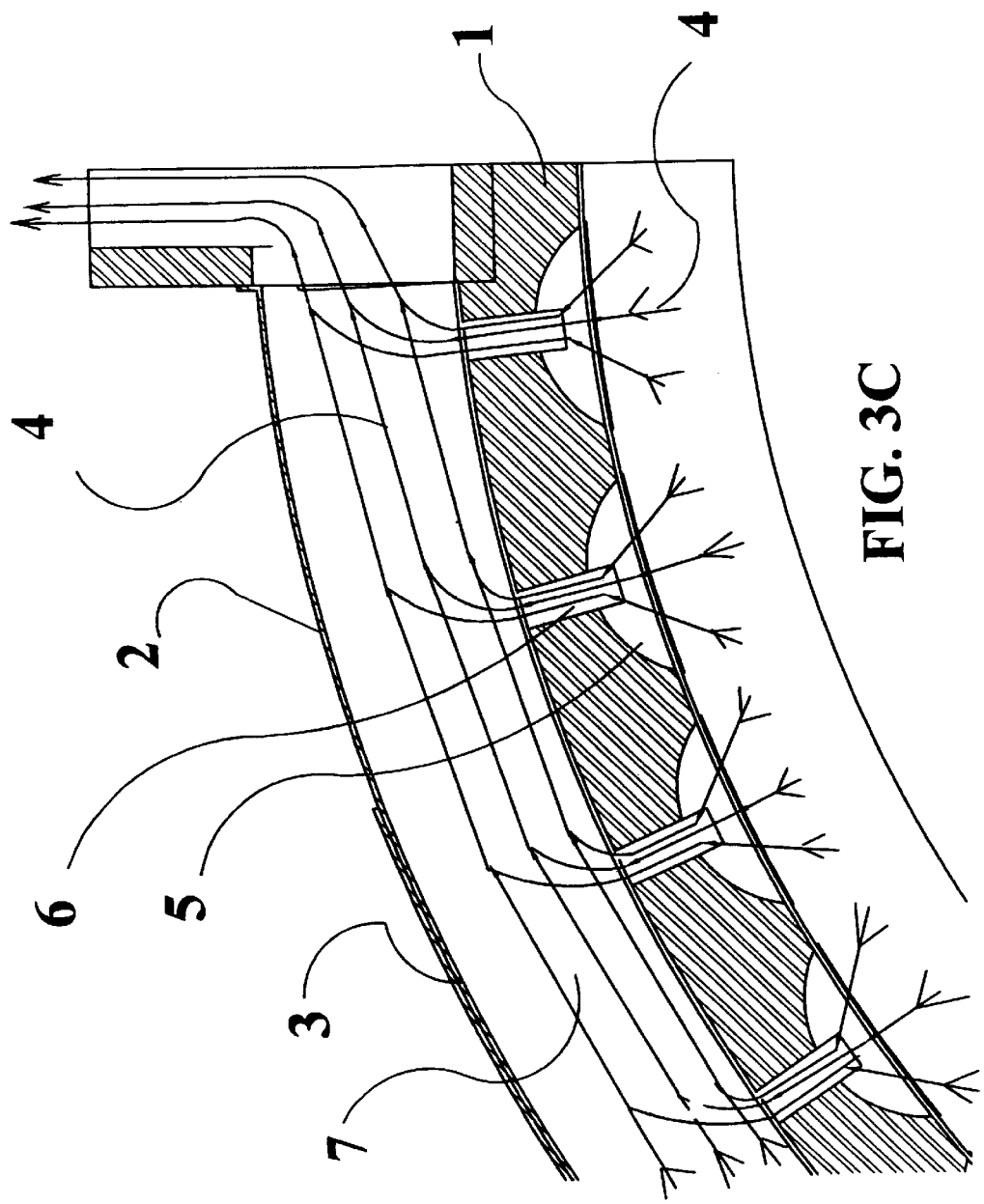
FIG. 3C is a detail view of the upper portion of the mold block shown in FIG. 3B.
Figures 3D, 3E:
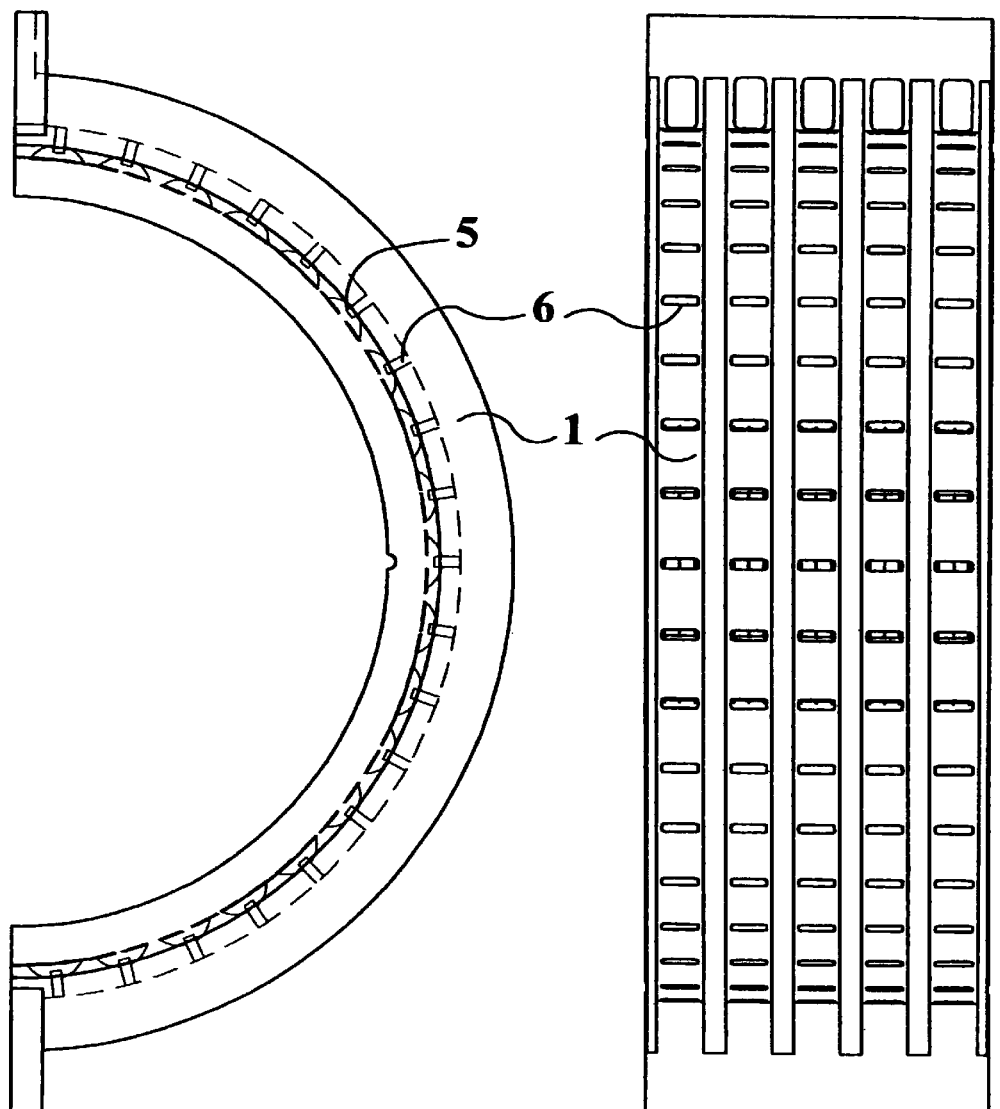
FIG. 3D is a side view of the mold block of FIG. 3A in which the inner and outer covers are removed.
FIG. 3E is a rear view of the mold block of FIG. 3A in which the inner and outer covers are removed.

The present invention facilitates both the method of continuously thermoforming large diameter extruded plastic pipe having transverse corrugations and the design of mold blocks utilized in continuous thermoforming. In the system and method of the invention, uniform negative pressure across slits at the interior lateral surface of the mold blocks is achieved by satisfying a specific relationship between the dimensions of the manifold, the dimensions of the slits, the number of slits, and the path length from the vacuum source. FIG. 1 is an exploded perspective view of a pair of mating mold blocks 1, with inner air-tight covers 2 and outer covers 3 shown disassembled. FIG. 2 is a perspective view of the pair of mold blocks showing the mold blocks 1, inner air-tight covers 2, and outer covers 3 as assembled. FIG. 3B, and more particularly FIG. 3C, are axial cross-sectional views taken along line →A—A← of the mold block shown in FIG. 3A, showing the flow of air 4 entering the slits 5, shown in FIGS. 3B and 3C as circular slits, but not necessarily so limited to a circular shape, and located at the internal lateral surface of mold block 1, passing through the radial slots 6 into the external manifold 7, and flowing out to the vacuum source. The side and rear views of the mold block represented in FIGS. 3D and 3E, respectively, show the elongated shape of the slots 6 and their radial orientation to the mold block. The shape of the manifold 7 is shown in a radial cross section through one of the radial slots in FIG. 4. Another radial cross section in which the manifold does not intersect the radial slots is shown in FIG. 5. The shape of the manifold 7 is not limited to the shapes shown in FIGS. 4 and 5. In the system and method of the present invention, the change in pressure along the length of the manifold 7 is selected to be very small compared to the change in pressure across the thin slits 5. Specific design parameters assure this relationship.

The expression for the volume flow rate of a Newtonian fluid in a closed channel having a rectangular cross section is:

$$Q = WD^3 \Delta P / 12 L \eta$$

in which

Q=Volume flow rate

W=Width of channel

D=Depth of channel $\Delta P$=Pressure change along the channel length

L=Length of channel along the flow direction $\eta$=Viscosity of air

R. Byron Bird, Robert C. Armstrong, and Ole Hassager, Fluid Dynamics, Volume 1, page 216, Wiley (1977).

The method of the present invention utilizes a criterion to determine the ratio of the size of the external channel to slit size that accounts for the varying distance of the slits from the vacuum source and that insures a uniform negative pressure at the interior lateral surface of the mold bases. This criterion requires that the change in pressure across the length of the slits located at the interior lateral surface of the die must be very large compared to the change in pressure across the path from the vacuum source to the entrance to the slits at the interior lateral surface of the mold blocks. In the case of a closed channel connecting the vacuum source having a rectangular cross section and n number of slits also having a rectangular cross section, the criterion based on a volume flow rate balance:

$$Q_t = W_c D_c^3 \Delta P_c / 12 L_c \eta = n W_s D_s^3 \Delta P_s / 12 L_s \eta$$

So that the criterion can be expressed as follows:

$$\Delta P_s / \Delta P_c = W_c D_c^3 L_s / n W_s D_s^3 L_c >> 1$$

The "c" subscripted parameters refer to the channel dimensions, the "s" subscripted parameters refer to the slit dimensions and the "t" subscripted parameter refers to the total volume flow rate. This criterion permits the mold designer to select dimensions that will optimize the uniformity and magnitude of the negative pressure at the interior lateral surface of the mold base regardless of the size of the mold bases. The expression $W_c D_c / n W_s D_s$, which represents the ratio of area of the channel to the aggregate area of the slits, is not, by itself, capable of indicating whether the relative pressure differences will increase or decrease. In other words, uniformity in vacuum at internal lateral surface of the mold can be achieved most efficiently by increasing the channel depth because $\Delta P_s / \Delta P_c$ varies with the $3^{rd}$ power of the channel depth and only linearly with the channel width.

This model can be utilized to determine how large the channel depth $D_c$ must be to insure vacuum uniformity, for example, in a mold base for a 72" diameter pipe having a distance between the vacuum source and the furthest slit $L_c$ of 108", channel width $W_c$ of 3", slit length $L_s$ of 2", slit width $W_s$ of 1", slit depth $D_s$ of 0.015", and 120 slits (n=120).

Figure 6:
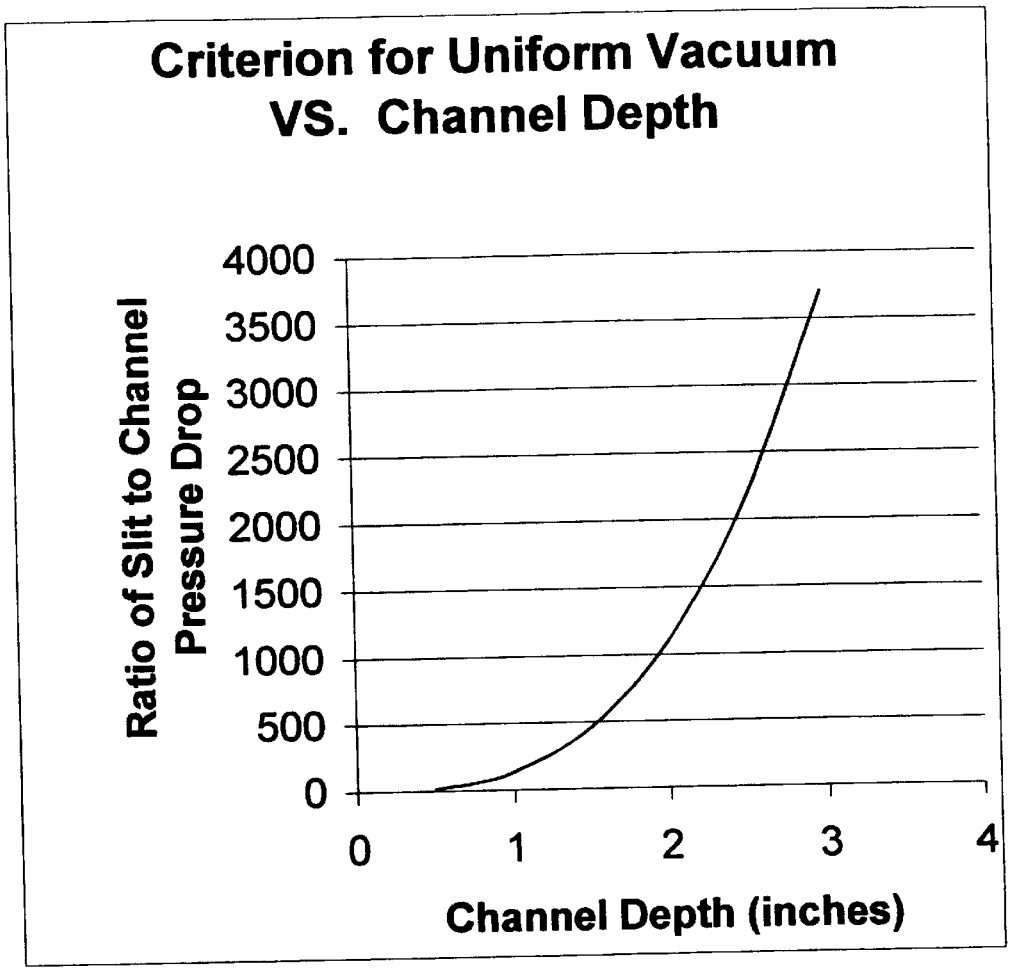
FIG. 6 is a linear plot illustrating the relationship between the criterion for uniform vacuum and channel depth.

FIG. 6 is a line graph illustrating the effect of the channel depth $D_c$ on the value of $\Delta P_s / \Delta P_c$, so that:

$$\Delta P_s / \Delta P_c = 137 D_c^3 >> 1$$

If one assumes a value for $\Delta P_s / \Delta P_c$ of 1000 or higher, the channel depth, $D_c$ must exceed 2" in order to assure that the external manifold has minimal resistance along its length. Large channel depth size would likely present a structural integrity problem, or at least result in costly fabrication for mold bases with internal porting that is typically accomplished by cross drilling. For these reasons, the external channel of the present invention teaches a practical means of connecting the vacuum source to the slits.

Figure 7:
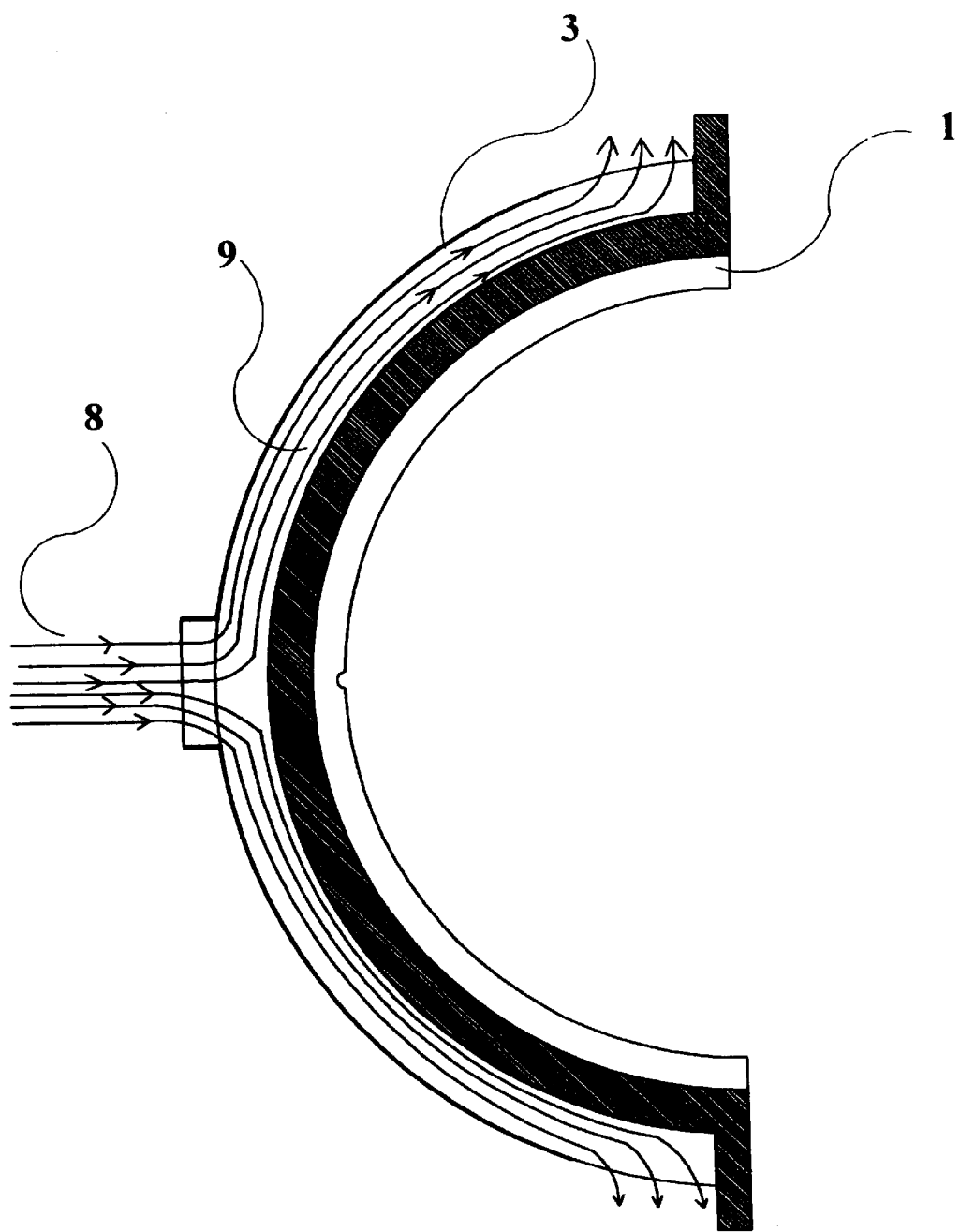
FIG. 7 is an axial sectional view of the mold block of FIG. 3A showing cooling by forced convection.

The system and method of the present invention also enables the efficient removal of heat during the solidification of the molten plastic pipe that contacts the internal lateral surface of the mold bases. The outer cover 3 of the mold block assembly, shown in FIG. 7, forms a duct 9. Cooling air 8 enters by way of the opening in the outer cover 3, travels a tangential direction inside the duct 9, and exits to the atmosphere when it reaches the end of the outer cover 3. The radial sections shown in FIGS. 4 and 5 show that full height of the inside walls of the open channel 7 conducts heat to the turbulent cooling air and that the inner channel cover serves to decrease the area of the duct 9. This decrease in area has the very positive effect of increasing the surface velocity of the cooling air in contact with the walls of the open channel or manifold 7.

The cooling air must carry away a substantial amount of heat, including the heat of fusion, in order to lower the temperature of the molten plastic to its crystallization temperature and increase the modulus of the plastic. A typical heat transfer coefficient value for forced convection inside tubes is 8.0 BTU per hour per square foot when the surface velocity is 31.8 feet per second. This heat transfer coefficient varies with the surface velocity to the 0.8 power. Mark's Standard Handbook for Mechanical Engineers, pages 4–87, McGraw Hill (1978). This means the heat transfer rate will increase 100% if the velocity is increased 140%. Similarly the heat transfer coefficient will be reduced 50% with a 57% reduction in the surface velocity. The present invention may be characterized as maximizing the surface velocity in the duct by reducing the area of the cooling duct perpendicular to direction of the flow, and simultaneously maximizing the heat transfer area by exposing the full inside walls of the outside channel.

Figure 8:
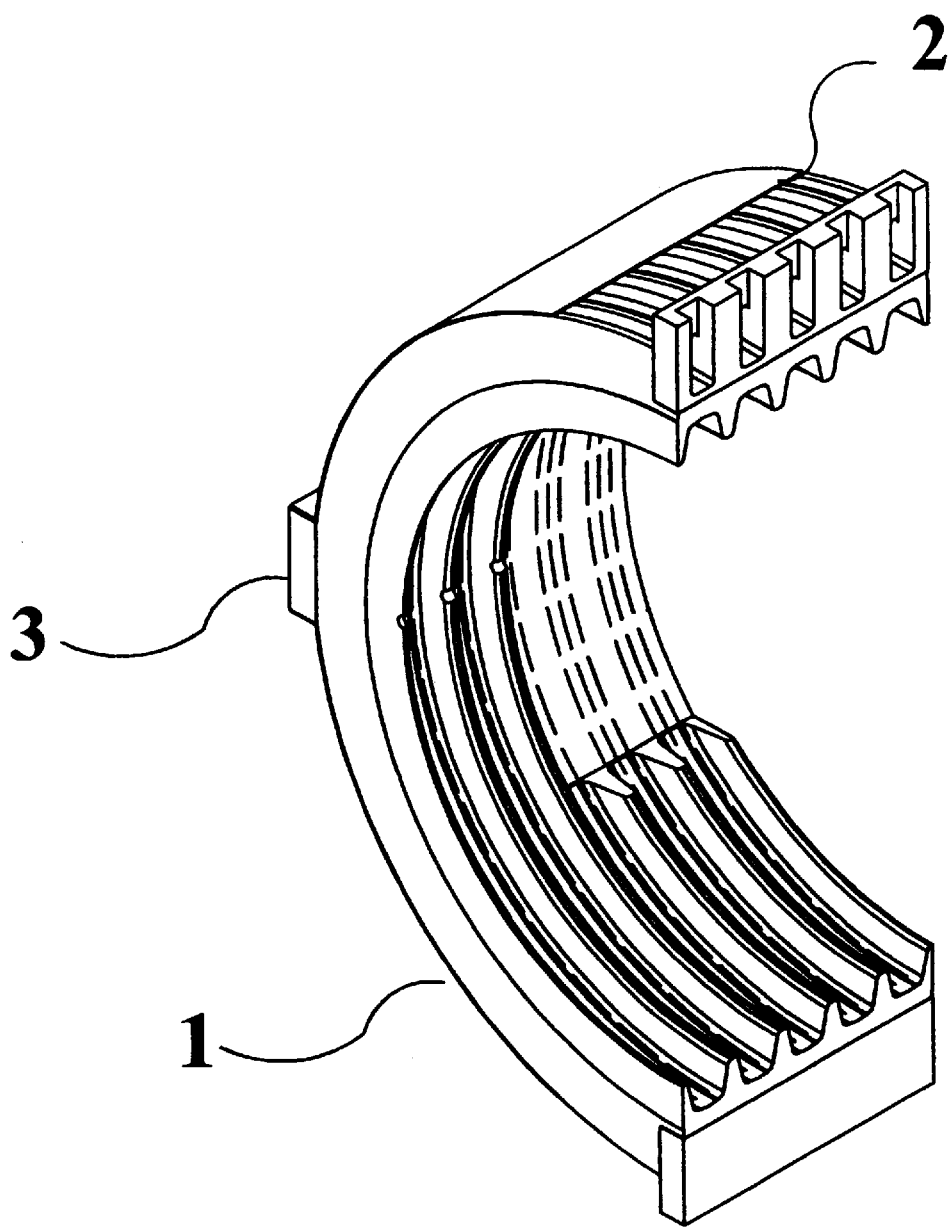
FIG. 8 is a perspective view of the mold base in another embodiment of the present invention for forming a partially corrugated pipe section.
Figure 9:
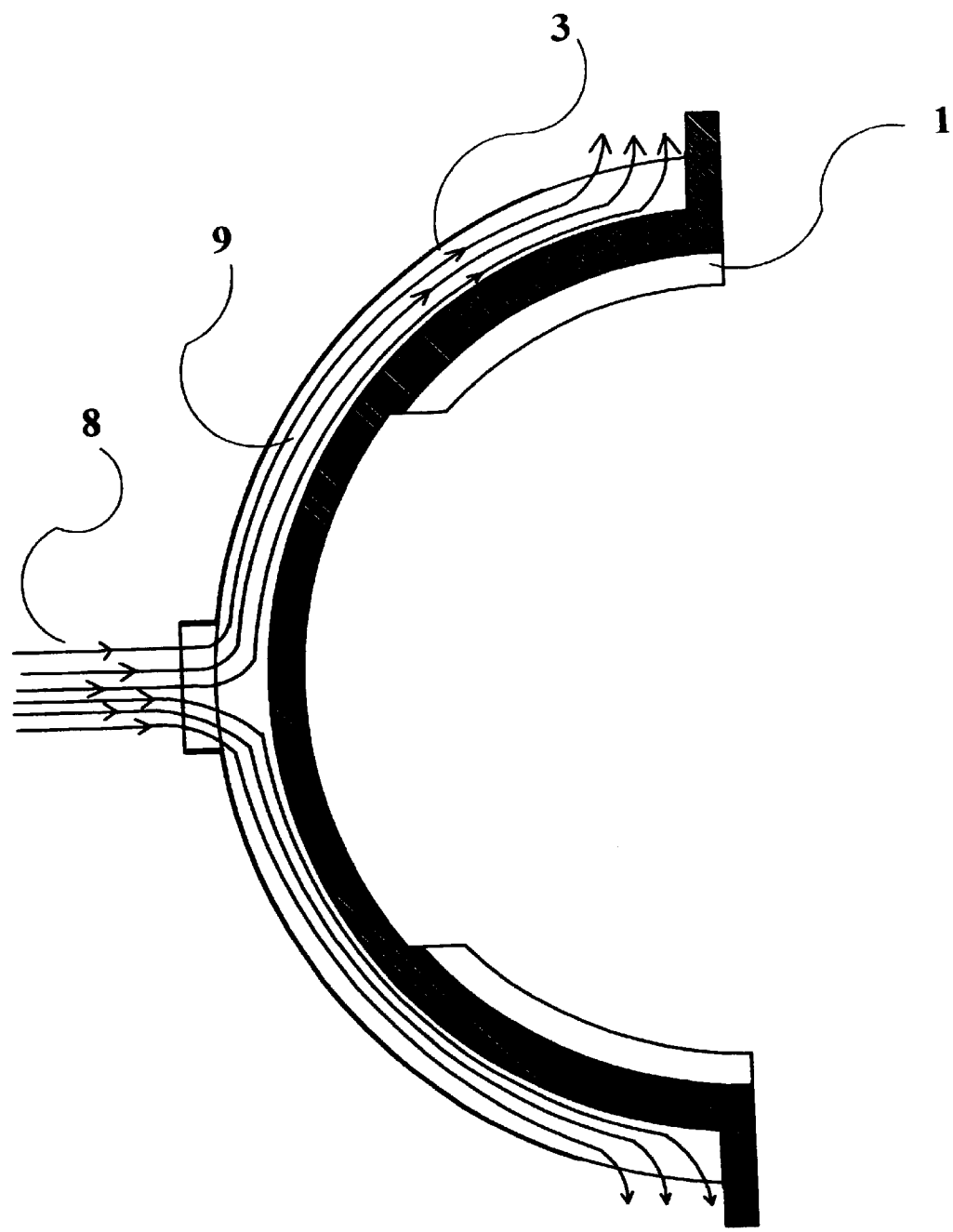
FIG. 9 is an axial sectional view of the mold base of FIG. 8 showing cooling by forced convection.
Figure 10:
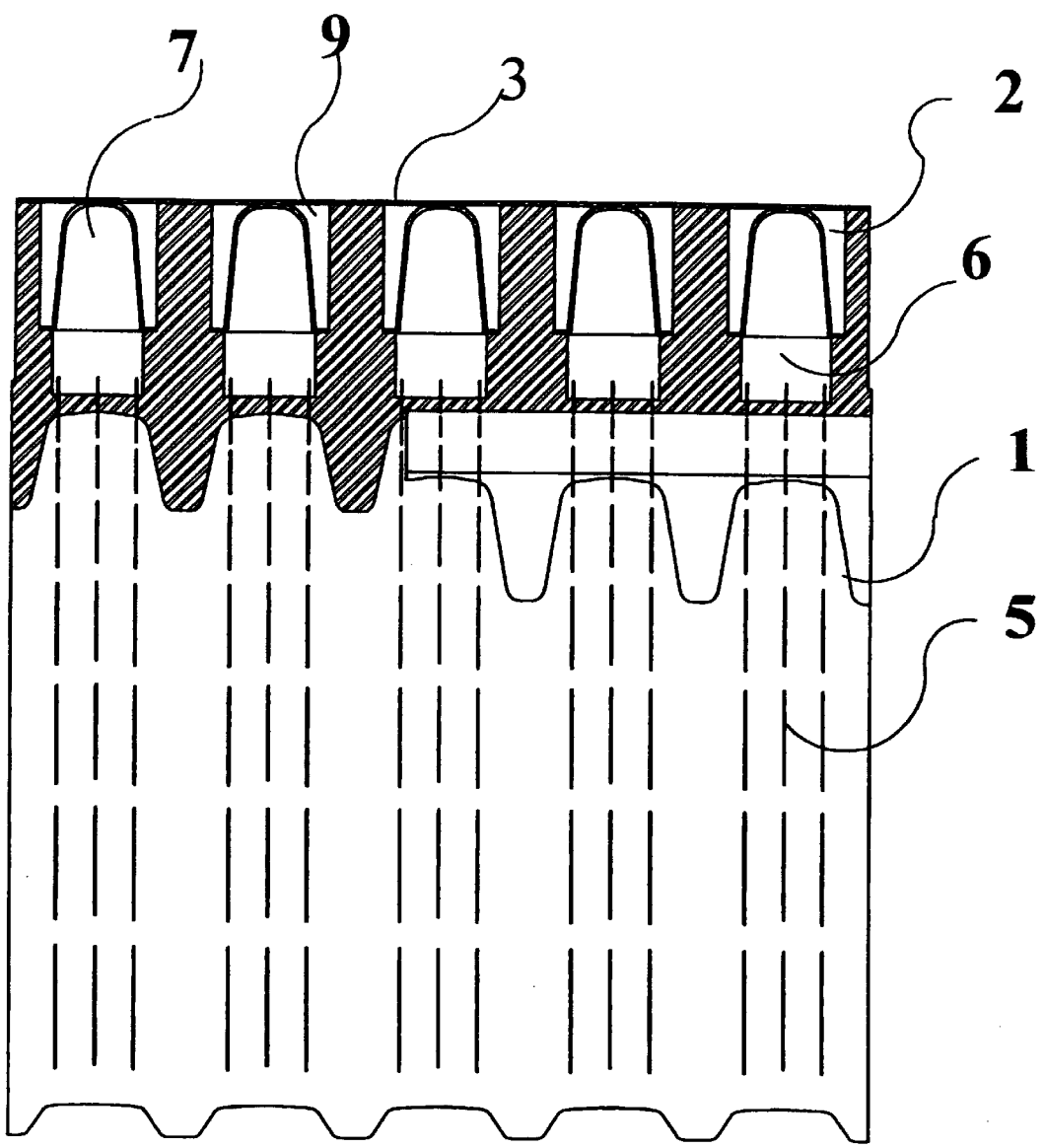
FIG. 10 is a radial sectional view of the mold base of FIG. 8.

Corrugated plastic pipe requires fittings and accessories such as T-, Y-, and X-joints and linear connectors that will have no corrugated areas for attachment purposes. In another embodiment of the mold block assembly of the present invention, the mold base can accommodate partially corrugated pipe sections, pipes with corrugations of different sizes, and bell and spigot joints. FIG. 8 is a perspective view of a mold base with the capability of thermoforming accessories and fittings having a combination of corrugated and smooth regions. FIG. 9 is an axial cross-section of the mold base of FIG. 8 illustrating the flow of cooling air. FIG. 10 is a radial cross section of the mold base of FIG. 8 showing a combination of slits 5, radial slots 6, and manifold 7, which functions to provide uniform vacuum and efficient cooling. The molds may be formed or machined from aluminum or aluminum type compositions or their equivalents, as typically used in the industry.

Having described the invention in detail, those skilled in the art will appreciate that, given the present disclosure, modifications may be made to the invention without departing from the spirit of the inventive concept herein described. Rather, it is intended that the scope of the invention be determined by the appended claims.

I claim:

1. A mold block assembly for thermoforming plastic pipe having transverse corrugations, comprising:
   a. a mating pair of mold blocks capable of mating along a parting surface; each of said blocks comprising:
      i. an internal lateral surface comprising at least one corrugation revolving around an axis;
      ii. an external lateral surface axially concentric with said internal lateral surface, said external lateral surface further comprising at least one channel concentric with said at least one corrugation, the width of said at least one channel corresponding approximately to the width of said at least one corrugation;
      iii. a vacuum port connected to said at least one channel;
      iv. a plurality of radial slots having approximately the same width, one end of each of said radial slots intersecting said at least one channel, said slots extending radially inwardly and terminating a distance from said internal lateral surface;
      v. a plurality of slits formed in said at least one corrugation at said internal lateral surface and intersecting the width of said slots; and
      vi. at least one outer cover on said external lateral surface forming an air tight manifold, said manifold having a large cross-sectional area relative to the aggregate area of said slits ported to said manifold through said plurality of radial slots.

2. An air-cooled mold block assembly for thermoforming plastic pipe comprising a mating pair of mold halves, said pair capable of mating along a parting surface, each half comprising:

a. an internal lateral surface having at least one corrugation revolving around an axis;

b. an external lateral surface axially concentric with said internal lateral surface, said external lateral surface further comprising at least one channel concentric with said at least one corrugation, the width of said at least one channel corresponding approximately to the width of said at least one corrugation;

c. a vacuum port connected to said at least one channel;

d. a plurality of slits formed in said at least one corrugation at said internal lateral surface and intersecting said at least one channel;

e. an inner cover for said at least one channel forming an air-tight manifold concentric with said axis, said manifold having a large cross-sectional area relative to the aggregate area of said slits;

f. an outer cover forming at least one outer circumferential duct between said outer cover and said inner cover, said outer cover having an opening to receive cooling air, said at least one duct being concentric to said axis, and having a cross-section shaped to maximize both the velocity of the cooling air received therein and the area of said inner cover in contact with said cooling air; and g. a source of cooling air ported to said at least one outer circumferential duct through said opening in said outer cover.

3. The mold block assembly of claim 2 in which the inner and outer covers are removable.

4. The mold block assembly of claim 1 in which the cross-sectional area of the plurality of slots is at least the aggregate area of the slits.

5. The mold block assembly of claim 1 in which the relationship of the change in pressure across the length of the slits with the change in pressure from the vacuum source to the slits is $\Delta P_s/\Delta P_c = W_c D_c^3 L_s/n W_s D_s^3 L_c >> 1$, where $W_c$ is the width of the channel, $D_c$ is the depth of the channel, $L_s$ is the length of the slits, n is the number of slits, $W_s$ is the width of the slits, $D_s$ is the depth of the slits, and $L_c$ is the length of the channel.

* * * * *